(12) United States Patent
Markowz et al.

(10) Patent No.: US 7,678,361 B2
(45) Date of Patent: Mar. 16, 2010

(54) MICROREACTOR COMPOSED OF PLATES AND COMPRISING A CATALYST

(75) Inventors: Georg Markowz, Karlstein (DE); Johannes Albrecht, Woellstadt (DE); Johannes Ehrlich, Alzenau (DE); Michael Jucys, Darmstadt (DE); Elias Klemm, Nuremberg (DE); Armin Lange De Oliveira, Heidelberg (DE); Reinhard Machnik, Rodenbach (DE); Juergen Rapp, Butzbach (DE); Ruediger Schuette, Alzenau (DE); Steffen Schirrmeister, Muelheim an der Ruhr (DE); Olaf Von Morstein, Essen (DE); Hartmut Hederer, Dortmund (DE); Martin Schmitz-Niederau, Muenster (DE)

(73) Assignees: UDHE GmbH, Dortmund (DE); Deguesa AG, Duesseldorf (DE)

( * ) Notice: Subject to any disclaimer, the term of this patent is extended or adjusted under 35 U.S.C. 154(b) by 679 days.

(21) Appl. No.: 10/553,312

(22) PCT Filed: Mar. 31, 2004

(86) PCT No.: PCT/EP2004/003377

§ 371 (c)(1),
(2), (4) Date: Oct. 14, 2005

(87) PCT Pub. No.: WO2004/091771

PCT Pub. Date: Oct. 28, 2004

(65) Prior Publication Data

US 2007/0053808 A1 Mar. 8, 2007

(30) Foreign Application Priority Data

Apr. 16, 2003 (DE) .................................. 103 17 451

(51) Int. Cl.
| B01J 19/24 | (2006.01) |
| C01B 15/029 | (2006.01) |
| C07C 27/00 | (2006.01) |
| C07C 27/12 | (2006.01) |
| C07C 39/04 | (2006.01) |
| C07C 27/06 | (2006.01) |
| C07D 301/12 | (2006.01) |

(52) U.S. Cl. .................. 423/584; 422/198; 422/222; 423/659; 518/712; 549/531; 568/716

(58) Field of Classification Search ................ 549/531; 568/716; 518/712; 423/584, 659; 422/198, 422/222

See application file for complete search history.

(56) References Cited

U.S. PATENT DOCUMENTS 5,534,328 A   7/1996 Ashmead et al.

(Continued)

FOREIGN PATENT DOCUMENTS

| CA | 2247662 A1 | 3/1999 |
| DE | 39 26 466 A1 | 2/1991 |
| DE | 196 54 361 A1 | 6/1998 |
| DE | 100 42 746 A1 | 3/2002 |

(Continued)

OTHER PUBLICATIONS

Janicke, Michael T., et al; The Controlled Oxidation of Hydrogen from an Explosive Mixture of Gases Using a Microstructured Reactor/Heat Exchanger and Pt/Al2O3 Catalyst; Journal of Catalysis; Apr. 25, 2000; pp. 282-293; vol. 191, No. 2, Academic Press, Duluth, Minnesota, US.

Primary Examiner—Wayne Langel
(74) Attorney, Agent, or Firm—Marshall & Melhorn, LLC

(57) ABSTRACT

The present invention discloses a microreactor for performing heterogeneous catalytic reactions, being of plate or stack construction for industrial use, with provision made for chambers between the plates for the chemical reaction and for the heat removal. Inside the reaction chambers, catalyst material is applied to the internal walls or filled into recesses, and in all chambers there are spacers. In particular the slot-shaped reaction chambers have channels with a hydraulic diameter smaller than 1500 μm and a ratio of free slot width to free slot height in the range of 10 to 450.

21 Claims, 8 Drawing Sheets

U.S. PATENT DOCUMENTS

| | | |
|---|---|---|
| 6,409,072 B1 | 6/2002 | Breuer et al. |
| 2002/0028164 A1 | 3/2002 | Schutte et al. |
| 2002/0106311 A1 | 8/2002 | Golbig et al. |

FOREIGN PATENT DOCUMENTS

| | | |
|---|---|---|
| EP | 0 903 174 A1 | 3/1999 |
| EP | 1 031 375 B1 | 8/2000 |
| WO | WO 98/37457 A1 | 8/1998 |

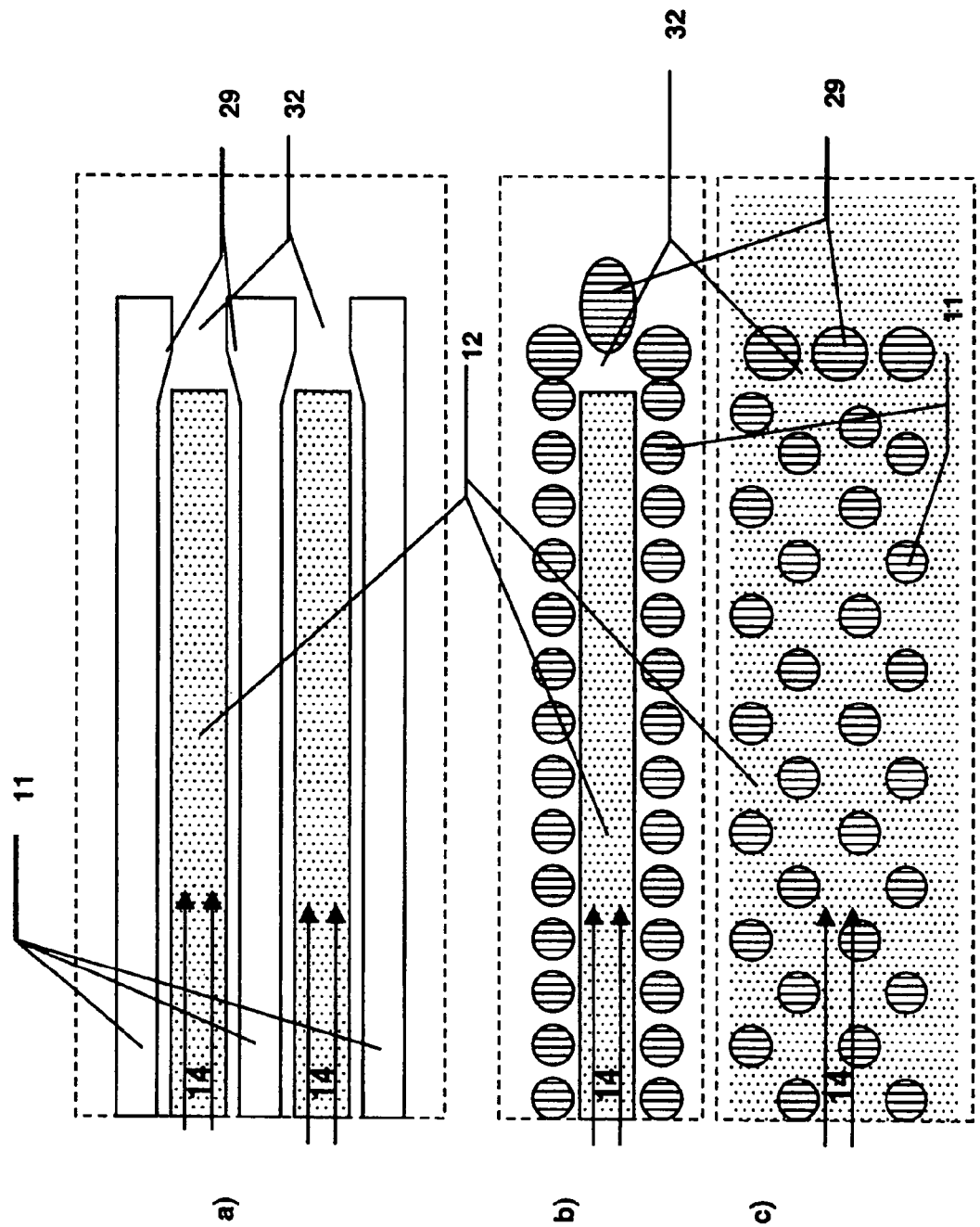

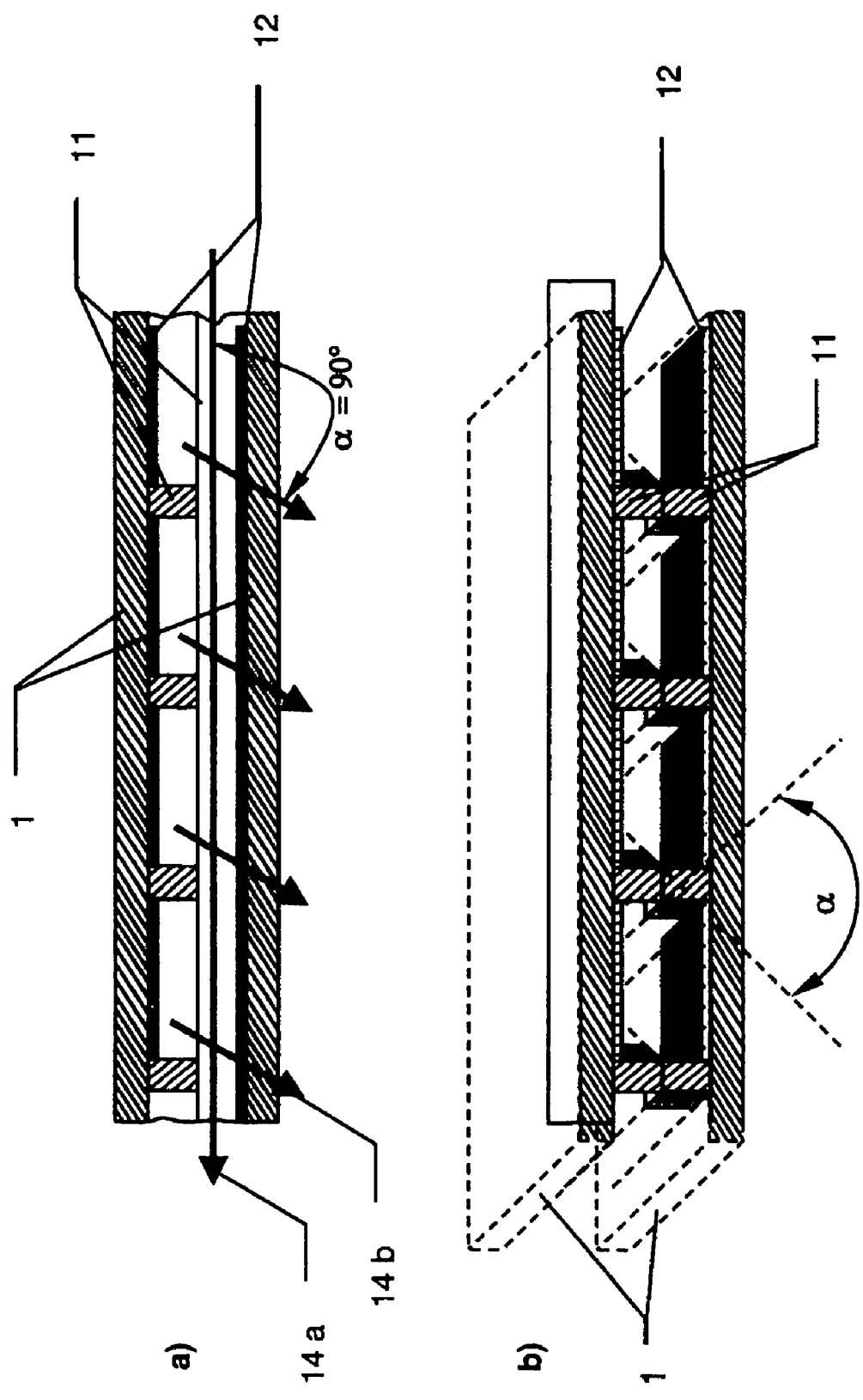

MICROREACTOR COMPOSED OF PLATES AND COMPRISING A CATALYST

BACKGROUND OF THE INVENTION

This invention relates to a microreactor with wall preparation for performing heterogeneous catalytic gas phase reactions on an industrial scale. The reactor is constructed in layers similar to a plate heat exchanger, with the chambers thus formed and stabilized and segmented by spacers representing reaction chambers and heat carrier chambers. The layer construction is calculated in size so that optimal conditions in terms of flow, heat and material transport, reaction kinetics, process reliability and structural stability exist for industrial use in tonnage-scale production.

Plate-type microreactors are in widespread use in industry in the most diverse applications. The construction of these stacked reactors is essentially similar and includes one or more central feed lines for educts or heat carrier fluids, from which substreams are tapped off and directed into the respective layer. After the individual streams have passed through a layer and the respective chemical or physical process step has taken place, they are brought together, material by material, in central discharge lines and fed to follow-up layers or directed out of the reactor.

Microplate reactors of the type previously mentioned are disclosed in US2002/0106311 and U.S. Pat. No. 5,534,328, in which a multiplicity of layers and layer sequences are described, some of which perform different functions, but there is no disclosure with regard to an optimized construction or process control construction for industrial use. This is a deficiency of these publications, particularly in respect of more extreme process conditions such as high pressures, high temperatures and/or severely exothermal reactions or explosive gas mixes.

In DE 39 26 466 there is a description of a microreactor for performing two-component chemical reactions whose use for reactions with severe heat of reaction is cited and which is also suitable for heterogeneous catalytic reactions. In the layers are longitudinal grooves through which the reaction partner flows after the bringing together of essentially two media, while a cooling medium flows in turn in a follow-up layer. This cooling is arranged transverse to the reaction grooves and takes place according to DE 39 26 466 at the end of the longitudinal grooves through the layer wall or over the complete layer length. To bring about the heat carrier operations and the necessary compactness, wall thicknesses of less than 1000 µm are specified, thus ruling out the use of this reactor for more highly aggressive reactions under high pressures. Furthermore, catalyst materials are often used in industrial applications which do not come from the group of known catalytically active metals and cannot be used as a base material.

In DE 196 54 361 there is a description of a stack-type reactor which is used for chemical-catalytic processes, the catalyst being applied as a layer to the inner walls of the reaction channels. Alternating with the layers containing the reaction channels there are layers in which a heat carrier fluid is conveyed similar to the previously mentioned publications, with a fluid connection existing between layers of identical type. In DE 196 54 361 there is disclosed a very simple variant for flow control within the reactor, whereby the reaction fluid arriving from the previous layer is distributed by means of a transverse slot to the following reaction layer or the discharge channel. A disadvantage of this nearly direct forwarding is that only very minimal homogenization processes take place between the substreams of the individual channels, resulting in the risk that channels will be used with different levels of intensity on account of varying flow resistances due to production tolerances of the wall or catalyst surfaces and to accumulations of deposits on the internal surfaces in the course of the reaction. This gives rise to a worsening of the reaction, resulting in the increased formation of byproducts and derived products or to a greater proportion of non-reacted educt at the outlet. The publication contains no information on the reaction-specific calculation of dimensions for the various layers or channels.

EP 1 031 375 discloses a microreactor for performing reactions in horizontal chambers, which works in similar manner to the previously mentioned reactor, with forwarding of the fluid to the next layer or function stage by way of a rotationally symmetrical channel. The decisive aspect of the microreactor disclosed in EP 1 031 375 is that the seal between the plates is effected without additional sealant materials by means of integrated sealing zones, which are realized through a high-grade surface finish on both sides and correct contact pressure. Another feature mentioned is that diverse processes and syntheses can be put together as required because this microreactor's function modules are interconnected with easy to separate connections. Very high requirements on surface finishes in contact and inspection areas in industrial applications are certainly a critical point, and for reactions with very pronounced heat of reaction or alternating pressure there is insufficient security against leaks.

In EP 0 903 174 there is disclosed a microreactor for fluid phase reactions of organic compounds using peroxides as oxidation agent, which solves the problem of reliable temperature control over an alternating and stack-wise sequence of reaction and cooling layers, whereby the microchannels of the neighboring layer always extend at right angles to each other and there is a maximal residual wall thickness between the reaction channel and the adjoining cooling layer of 1000 µm and a maximal hydraulic diameter of the reaction channels of likewise 1000 µm. The central challenge facing the peroxide reactions cited in this publication is explosion protection. Hence the imperviousness of the system and the assurance that the reactants used are optimally mixed is a fundamental requirement to prevent areas with explosive peroxide concentrations, but EP 0 903 174 makes no disclosures in this connection except for calculating the size of the channel cross-sections. In the publication mentioned, explosion protection is considered solely from the perspective of reliable compliance with the temperature required and concentrations.

From DE 100 42 746 there is known a device and a method in which at least two fluid media react with each other, whereby a pourable or wall-adhering catalyst is present if required. The reaction takes place in the described reactor in flat, gap-shaped reaction chambers. In the plates forming these reaction chambers there are cavities or bores in which the heat carrier fluid is passed through. The basic idea of this reactor disclosed in DE 100 42 746 is a parallel and flat fluid-moving reaction chamber without any additional built-in parts, with single spacers in the edge zone ensuring the right gap between two panels. Microdimensions in the range from 50 to 5000 µm are set in one dimension only, namely in the gap width. A further central feature is the inherent safety of this reactor, as the small free diameter suppresses the flame propagation. This reactor is very promising in its basic idea, but in industrial use with the large flat gaps there are likely to be partial blockages of the reaction slots. Such partial blockages result from high-pressure differences between the reaction chamber and the heat carrier fluid or from thermally induced stresses, for example in process-related start-up or shut-down operations.

When the wall is coated with a catalytically active material it is also likely that the previously mentioned material movements and process-induced oscillations and vibrations will cause flaking, leading in turn to partial blockage. The many cavities in the plates are very elaborate to manufacture and also very difficult to check and clean. The possibility of co-directional or counter-directional flow through the reaction slots and heat carrier chambers, such as is required for many reactions, is not available.

BRIEF SUMMARY OF THE INVENTION

Compared to the state of the art initially described, the present invention addresses the technical problem of specifying a microreactor for large-scale industrial use, with which heterogeneous catalytic reactions can be performed at high temperatures and pressures and in explosive process conditions, with which materials can be produced in quantities of several tons per day and the capacity can be increased by simple duplication of the reaction and heat carrier chambers.

This object is accomplished in accordance with the invention on the basis of the features of claim 1, and by further aspects based on the features of the subclaims. According to the invention, a microreactor for performing heterogeneous catalytic reactions has a multiplicity of chambers in a vertical or horizontal and essentially parallel arrangement. These chambers each have at least one feed line, which is connected to at least one manifold, and also include discharge lines that are connected to at least one header. The feed lines of the chambers and fluids or identical type are interconnected, and the same applies for the discharge lines of chambers of identical type. The chambers are formed by stacked plates or layers, whereby some of the chambers are reaction chambers in which the chemical-catalytic reaction takes place, and the rest are heat carrier chambers for passing through a cooling or heating fluid, whereby the heat transport between the reaction chambers and the heat carrier chambers is effected through at least one common chamber wall or directly adjoining neighboring plates. In all the chambers there are spacers in order to direct the force from an externally applied contact pressure through the plate stack and to suppress blockage of the microchannels due to deformation of the free supported width. This deformation results from the pressure difference between the reaction chamber and the heat carrier chamber. According to the invention, a catalyst material is applied at least to part of the internal walls of the reactor chambers. Surprisingly it was discovered that, after the catalyst is applied, the cross section of free flow in the microstructures of this construction has to display a hydraulic diameter of less than 4000 µm and a ratio of slot width to slot height of less than 800.

Depending on the base material selected for the plates, the invention discloses furthermore that a particularly advantageous reactor construction exists when the hydraulic diameter of the cross section of free flow is less than 1500 µm and ideally less than 500 µm, whereby the ratio of the distance between neighboring spacers to the slot height of the reaction chamber is less than 800, preferably less than 450 and ideally less than 100. However, this length ratio must not be less than 10. In this case the distance between two spacers means the smallest perpendicular distance, and in the case of parallel slots is thus the slot width. The slot height and distance between spacers are understood to mean the values after coating, as only these values form the cross section of free flow. Surprisingly it was discovered that undesirable fluid and chemical side effects are negligible in the reaction chamber with such a plate construction.

Given an effective plate height of less than 4000 µm and a metallic base material for the plate, the limiting variable for heat transport is the thickness of the catalyst layer, which can be approximately 2 mm thick, thus enabling a quasi isothermal operation of the microreactor.

The catalyst coating of the internal chambers can also be extended to the header or manifold chamber, with the possibility of applying a different catalyst to the wall surfaces in these areas than in the reaction slots.

The shape of the spacers is not restricted in any way and can be rotationally symmetric, drop-shaped, rhombic or advantageously designed as webs and ideally as continuous webs. What is important is an adequate load bearing ratio, which is a function resulting from the material properties of the base material, the process temperature and the pressure difference between neighboring chambers, and the resulting contact pressure to be applied from the outside.

The main advantages of designing the spaces as continuous webs are the influence exerted on the flow characteristics in the rectangular reaction slots thus formed, the additionally created adhesion surface for the catalyst material and manufacturing aspects.

The flow characteristics, diffusion effects and material transport operations can be very well simulated and optimized in defined slots. At the same time it is possible to suppress the effect of cross flow and backmixing. The side faces of the webs serve the catalyst adhering to the walls as a contact and adhesion surface, thus stabilizing the catalyst bed. In manufacturing terms, plates with uniform slots or webs can be manufactured on standard machines very economically and with little technical outlay. It was discovered that to provide an adequate bearing surface the share of the standing or base area of the spacers on a plate forming a reaction or heat carrier chamber in relation to the overall area of the plate lies ideally in the range of 5-15%, and that this share should be above 2.5% but not exceed 30%. The reference surfaces in this case are only those faces of the plates which lie within the circumferential gaskets and welded or soldered sealing seams terminating the reaction chambers or heat carrier chambers. The plate material positioned outside the gaskets is largely comprised of solid material and has no importance for the previously mentioned analysis of the load bearing surfaces. Given a high pressure difference between the process chambers and the heat carrier chambers, the head faces of the spacers thus enable an adequate load bearing ratio for passing on the force of a contact pressure applied through the two end plates or terminal anchors or anchor plates. If the spacers are constructed as webs, the smallest web width is 1000 µm. A web width of more than 6000 µm is generally no longer of interest in terms of cost-effectiveness and manufacturing.

Another advantageous embodiment of the device according to the invention exists when the catalytic material is inserted in a recess which is formed, for example, by removing material from the plate. This method of placing the catalyst on the plate enables a very uniform application because the projecting catalyst material can be removed at the height of the base plate by mechanical means, for example a scraper or abrasive. The recesses can take any form and are advantageously designed in the shape of grooves or slots, whereby ideally such a groove or slot always runs exactly between two webs in a reaction gap.

Another aspect encompassed by the invention is that at least parts of the plate or web material have a catalytic effect. This is primarily the case when metallic materials such as precious metals, manganese, molybdenum, iron, chrome, nickel and others are used. Depending on the energy curve of the catalytic reaction taking place in the specific case, the directions of the main stream in neighboring reaction and heat carrier chambers can be arranged to result in a co-directional, counter-directional or meandering throughflow in relation to the next chamber. Above all it is possible to create quasi isothermal reaction conditions because the heat transport also takes place parallel to each reaction chamber in a direct link. If a metallic base material is used, and if the slot and plate geometries are optimized in accordance with the above mentioned specifications, the heat transport will be limited above all by the coating thickness of the catalyst material.

In another embodiment the webs of two plates are arranged facing each other so that the webs form an angle of 0° to 90° with each other. In a particularly advantageous aspect these webs are arranged parallel with and directly above each other. A non-parallel arrangement of the webs results in an intensive mixing and swirling effect.

In another advantageous aspect of the invention provision is made for at least one area in the entrance to and inside the reaction chambers in which at least two fluids are mixed, whereby at least one gaseous or liquid fluid is injected, which can be followed by a homogenization section. Another aspect encompassed by the invention is that a device of random shape is arranged in front of or along this homogenization section, which reduces the free cross sectional area perpendicular to the direction of the main stream. This reduction of the cross sectional area causes an increase in flow velocities and hence an intensive mixing of the fluids. Appropriately constructed, the areas with a reduced cross section of free flow represent a mechanical flame barrier. This flame barrier or quench effect thus prevents ignition processes from the reaction section, which is primarily localized in the area of the reaction slots with the catalyst coating, from overspilling to other process units, and flames originating from the manifold or header from entering the reaction section.

In another device according to the invention the chamber wall is provided with bores which are inclined at an angle of −60° to +60° and preferably at an angle of −30° to +30° in relation to the perpendicular to the direction of the main stream and which are connected by means of at least one common channel extending essentially transverse to the direction of the main stream. A fluid is injected into the reaction chamber or into the respective reaction slots through this main channel and the bores. Another aspect encompassed by the invention is the provision of at least one device at the end of the reaction chambers in flow direction, which reduces the free cross sectional area perpendicular to the direction of the main stream, the device having a random shape and being constructed advantageously of a multiplicity of spacers, as extensions of the web widths or as baffles and ideally as a reduction of the gap height. This cross sectional reduction at the end of the reaction chambers serves to homogenize the flow and, with suitable microstructuring, represents a mechanical flame barrier similar to the previously mentioned design of the entrance area, thus preventing that an ignition originating from the catalyst gets into the adjoining reactor or process units which are usually macrostructured. Surprisingly it was discovered that in order to meet the demand for greater protection from explosions there must no longer be any catalyst material placed in the inversion section as otherwise an ignition originating from the catalyst can work through into the header even when there is a mechanical flame barrier.

The homogenization of flow is very advantageous because, for example, areas of unevenness in the catalyst layer can cause various pressure differences either in areas of the reaction chambers or in individual slots, thus resulting in an irregular throughflow, which leads to corresponding disadvantages in product quality as is known from the state of the art. It was discovered that the pressure loss due to the cross sectional constriction at the outlet of the plates has to be greater than the fluctuation of the pressure difference resulting from the production tolerances of the catalyst layer by at the least the factor 5. Ideally the pressure loss over the inversion section should be greater than the previously mentioned fluctuation-induced pressure loss by the factor 10. By selecting the previously mentioned channel width, which clearly does not lie in the microrange, it is possible to arrange this element in each individual channel in a manner that makes sense in constructional terms and is easy to manufacture.

Also disclosed are processes for the use of the previously mentioned reactor in accordance with the invention, which are performed at differential pressures in the range from 0 bar to 15 bar, the ideal range of application lying between 0 bar and 5 bar depending on the base material selected. The possible process temperatures range from low temperatures below 0° C. to temperatures of approximately 500° C. Liquid or gaseous media can be passed through the heat carrier chambers for heat transport purposes.

With a special aspect of the invention provision is made for the media in the heat carrier chambers to change their aggregate condition, either completely or partly, by condensation or evaporation, while passing through.

Hence the invention encompasses processes such as, for example, the synthesis of propylene oxide from essentially propene and hydrogen peroxide or phenol from essentially aromatic hydrocarbons as well as the further synthesis of hydrocarbon compounds and particularly of oxygenates of hydrocarbon compounds. Furthermore, the reactor is suitable for the synthesis of hydrogen peroxide from hydrogen and oxygen.

BRIEF DESCRIPTION OF THE DRAWING

The invention will be explained in more detail in the following with reference to drawings of embodiments. In the drawing

FIG. 7 is a detail view of the end of the reaction slots, the shape of the spacers and the position and shape of the inversion device in two embodiments;

FIG. 8 shows possible arrangements in a reaction chamber.

DETAILED DESCRIPTION OF THE INVENTION

Figure 1:
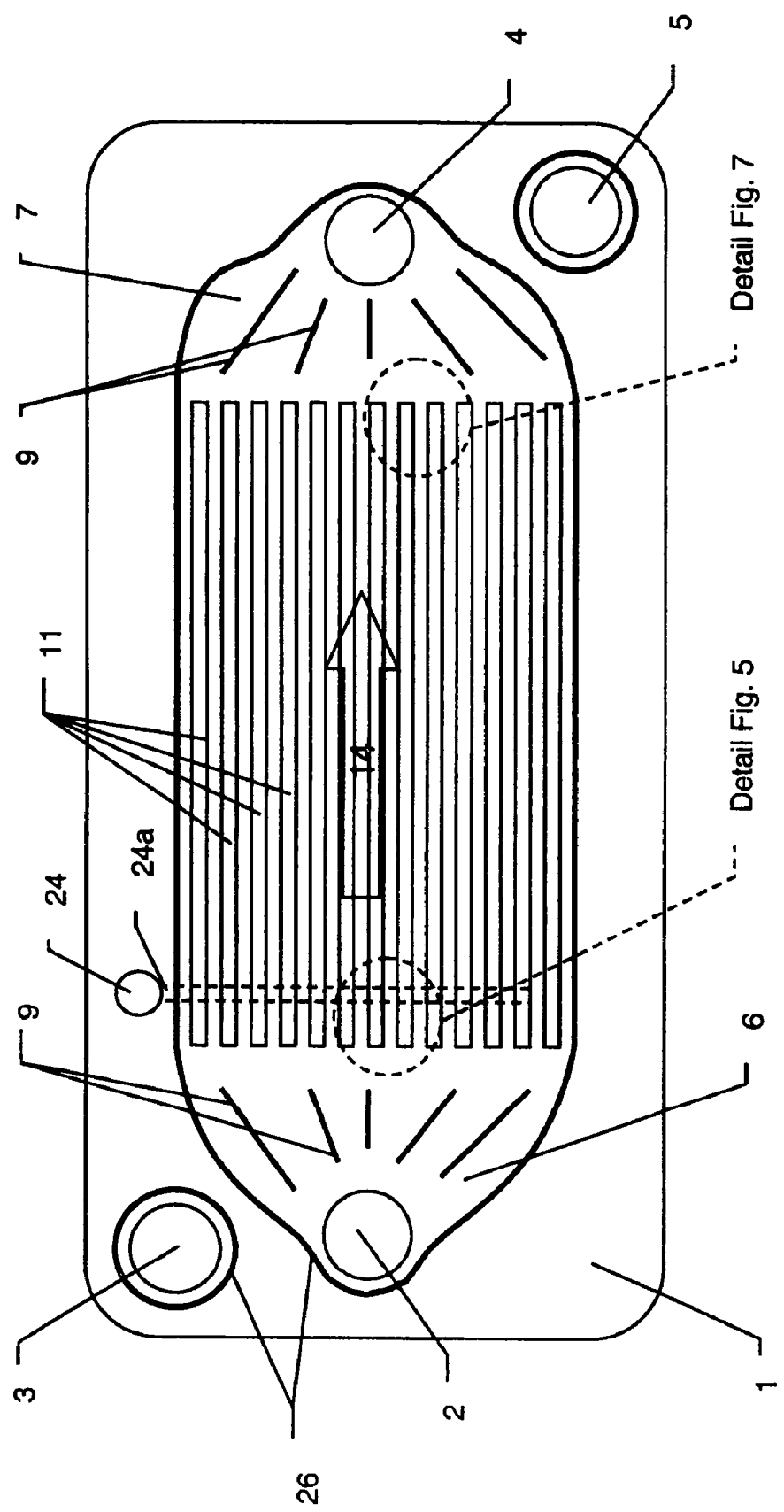
FIG. 1 is a plan view of a single reactor plate and the position of the detail view of FIG. 5 in the entrance area of the plate, the position of the detail view of FIG. 7 at the outlet of the plate, and the gasket and guide web arrangement.

FIG. 1 shows a reactor plate forming a reaction chamber, on which an arriving educt can be guided through the central feed line 2 into the manifold 6 of the reaction chamber 8.

Figure 3:
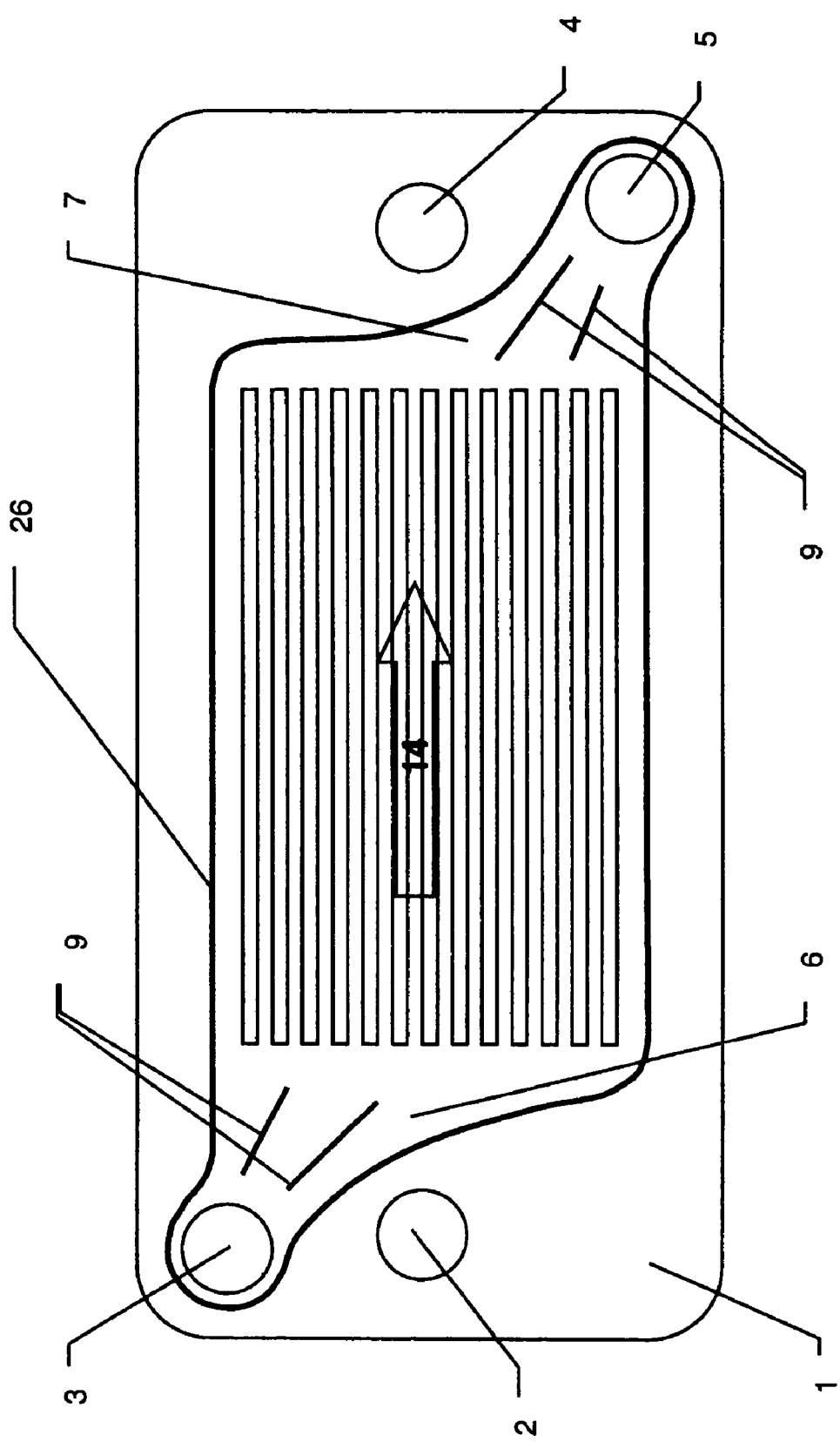
FIG. 3 is a plan view of a single heat carrier plate and a variant of the gasket arrangement and guide webs.

Arranged in the manifold are guide webs 9 which distribute this educt uniformly between the slots coated with catalyst material, which are constructed between the spacers 11, shown here as webs. The slots are in a parallel arrangement and dictate the direction of the main stream 14. Shown at the end of the slots is the header 7, in which a product stream is collected and passed on, by means of additional guide webs 9, to the central discharge 4. FIG. 1 also shows the central feed line 24 for a second educt stream that feeds channels 24a extending transverse to the direction of the main stream 14 in the base plate 1, which are connected to the bores 25 shown in FIG. 5. This second educt stream is injected into the reaction chamber through these bores. Reaction chambers 8, heat carrier chambers 10 and their inlets and outlets are sealed by means of irreversible connections and/or gaskets. The plate of a heat carrier chamber shown in FIG. 3 has a similar construction, whereby the webs 11 in the embodiment shown extend parallel with and congruent to the webs of the reaction chamber. The catalyst coating and feed line for additional fluids are not provided for in this case.

Figure 2:
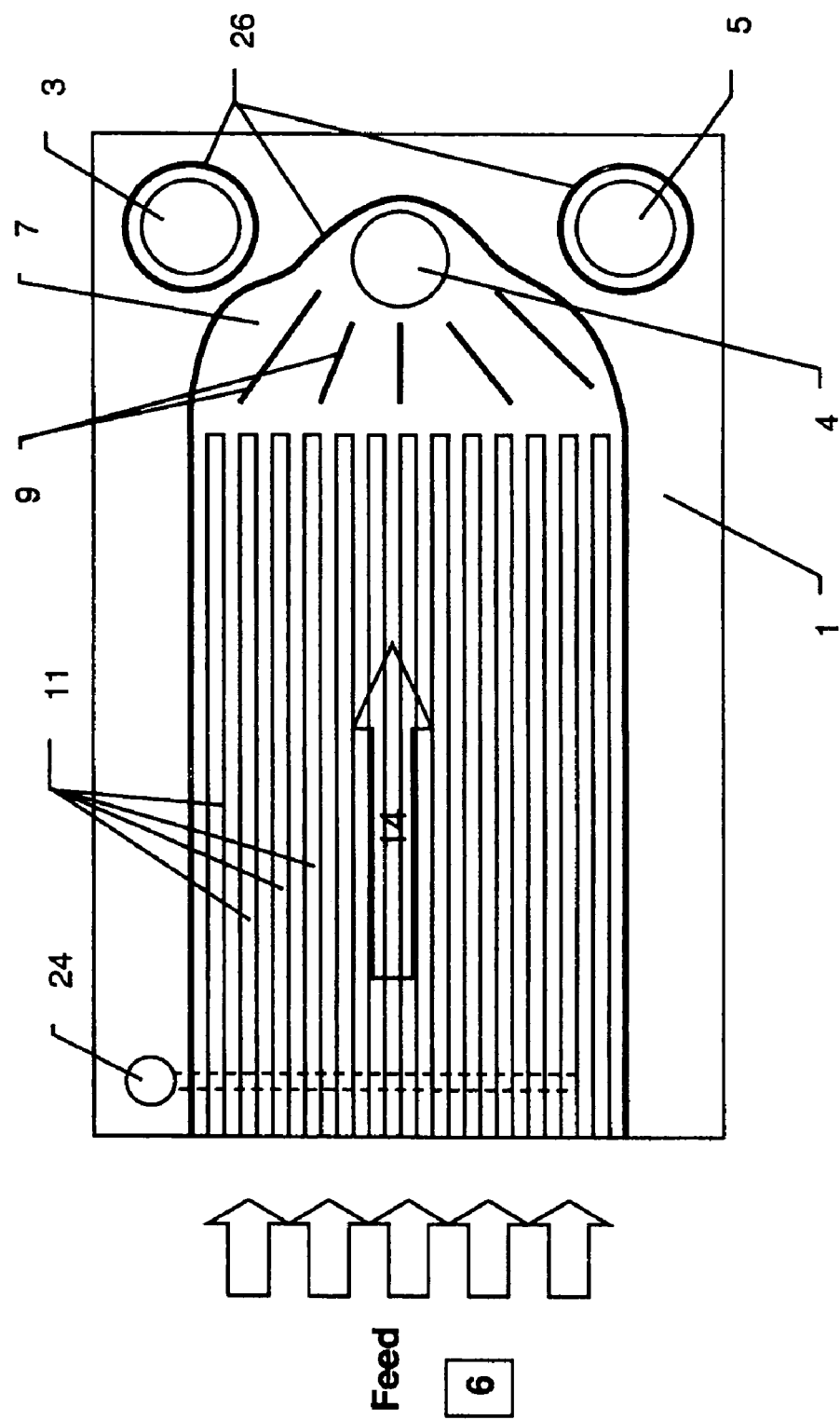
FIG. 2 is a plan view, similar to FIG. 1, of a single reactor plate which does not have an integrated manifold but is receptive over the full width of the narrow side of the plate.

FIG. 2 shows a reactor plate which does not have an integrated manifold chamber in the reaction chamber but receives a central educt stream together with the other reactor plates not shown here.

Figure 4:
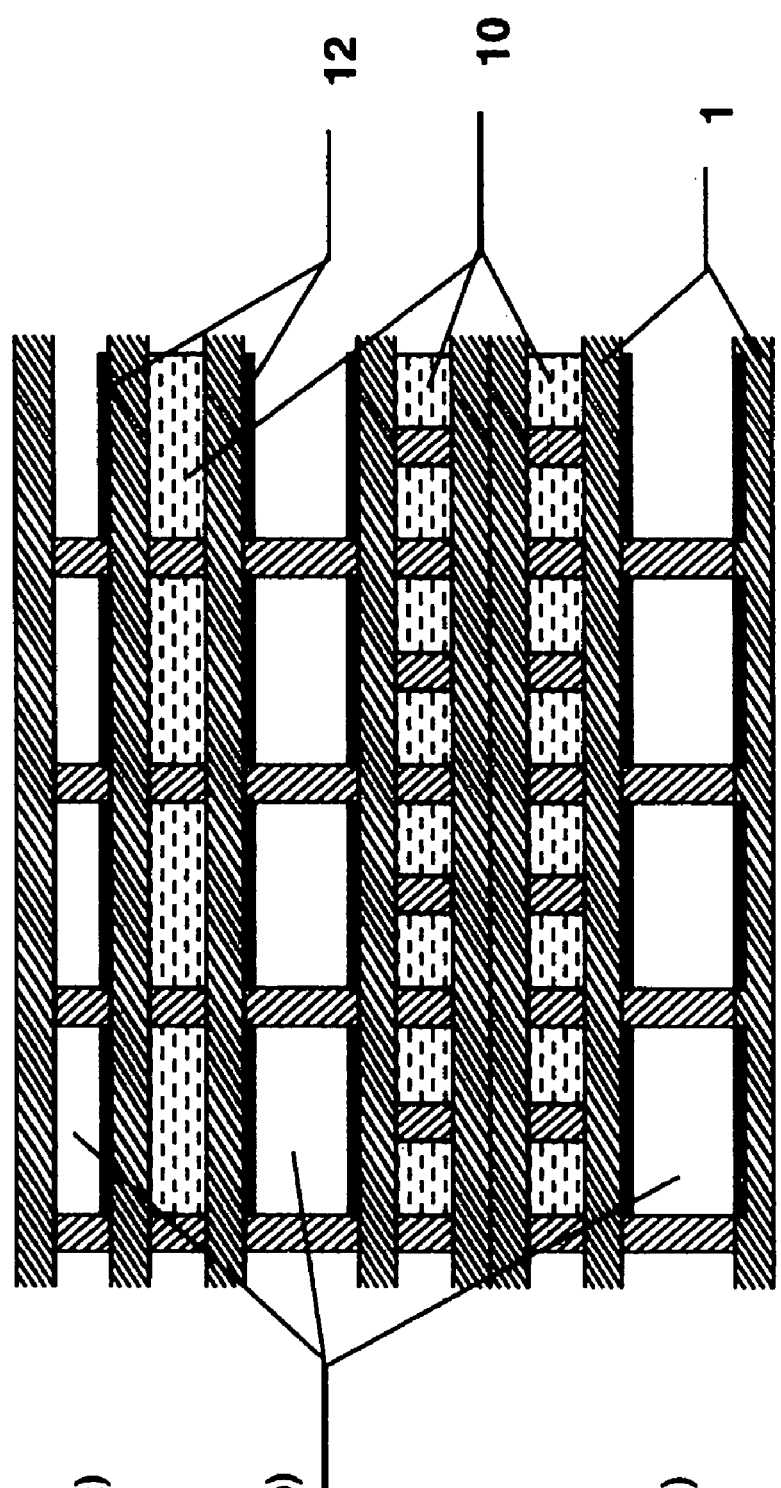
FIG. 4 is a sectional drawing exemplary for a stacked series of reactor and heat carrier chambers.

FIG. 4 is a sectional drawing exemplary for a stacked series of reactor and heat carrier chambers, the direction of the main stream leading perpendicularly out of or into the drawing plane. Visible in the reaction chamber a) are slots coated on one side with catalyst material 12, the subsequent heat carrier chamber being of similar construction. Compared to the slots of the adjoining heat carrier chamber, the maximal possible cross section of flow for the reaction slots is reduced by the cross sectional area of the catalyst layer. Visible in the reaction chamber b) are slots equipped with catalyst on both plate surfaces. This is followed by heat carrier chambers containing a different number of slots. In the reaction chamber c), both plate walls are coated with catalyst, the one plate surface having recesses in which the catalyst material 12 is inserted (refer also to FIG. 6c)). The maximal possible cross section of flow is thus reduced by only the cross sectional area of one catalyst layer.

Figure 5:
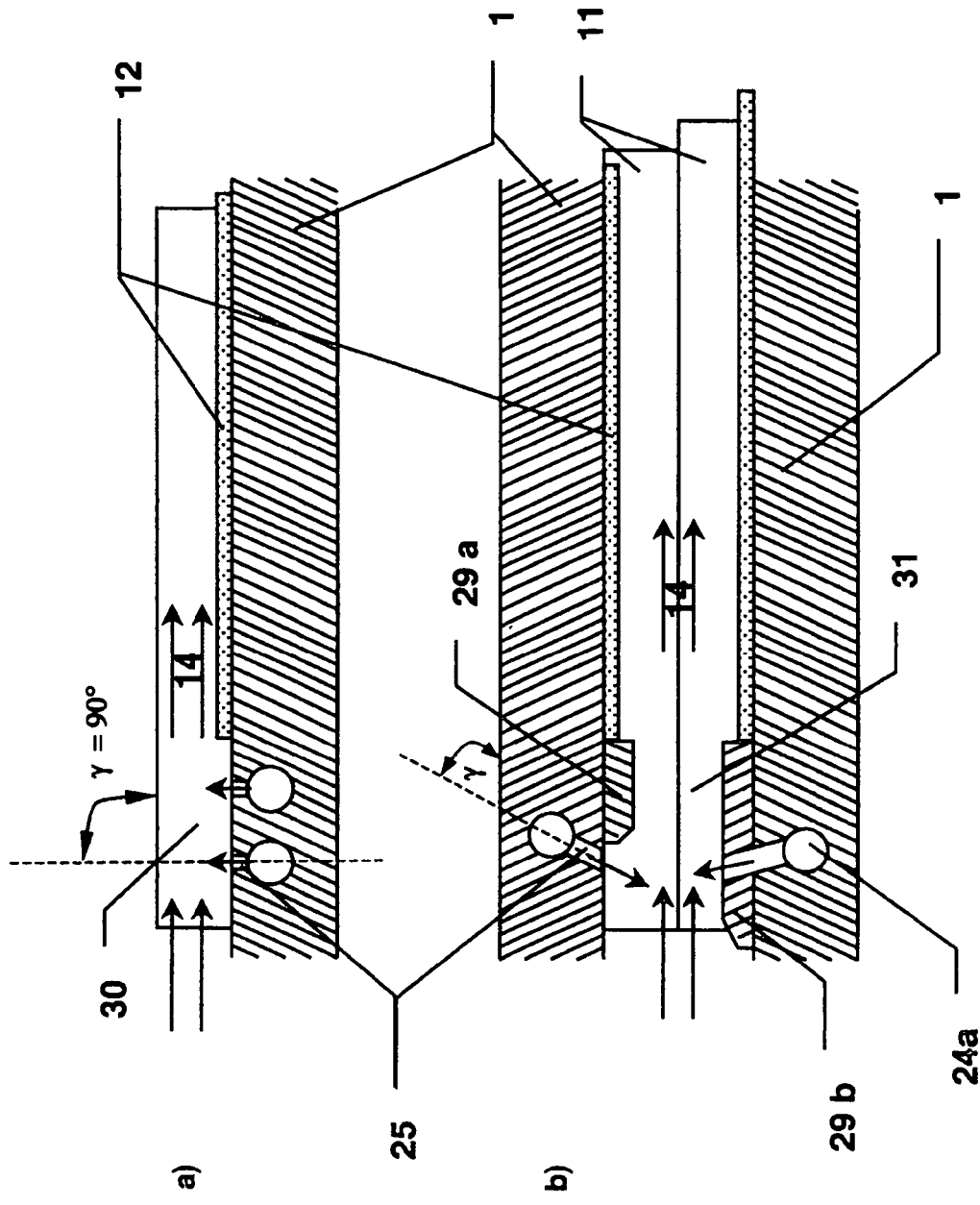
FIG. 5 is a detail view of the entrance area of the slots, the device for injecting fluids and the homogenization section in two embodiments.

FIG. 5 shows the inflow area of individual slots in three variants, whereby the educt stream coming from the manifold flows into the mixing section 30 where a second and third fluid are added to the educt stream via the feed side 24a and the bores 25. The bores 25 stand at right angles as shown in a) or are inclined at an angle γ (FIG. 5b)) in the same direction as or in opposite direction to the main stream. In front of the entrance to the reaction section, which is characterized by the wall coating of catalyst material, there is a homogenization section 31 in which the flow velocity is increased, turbulent conditions created and optimal mixing achieved by means of internals 29. FIG. 5b) shows two embodiment variants of possible internals. The internals 29b) already reduce the cross section of free flow in the area of the mixing section 30, resulting in microstructures and creating a more extensive mechanical flame barrier than is the case with the internals 29a).

Figure 6:
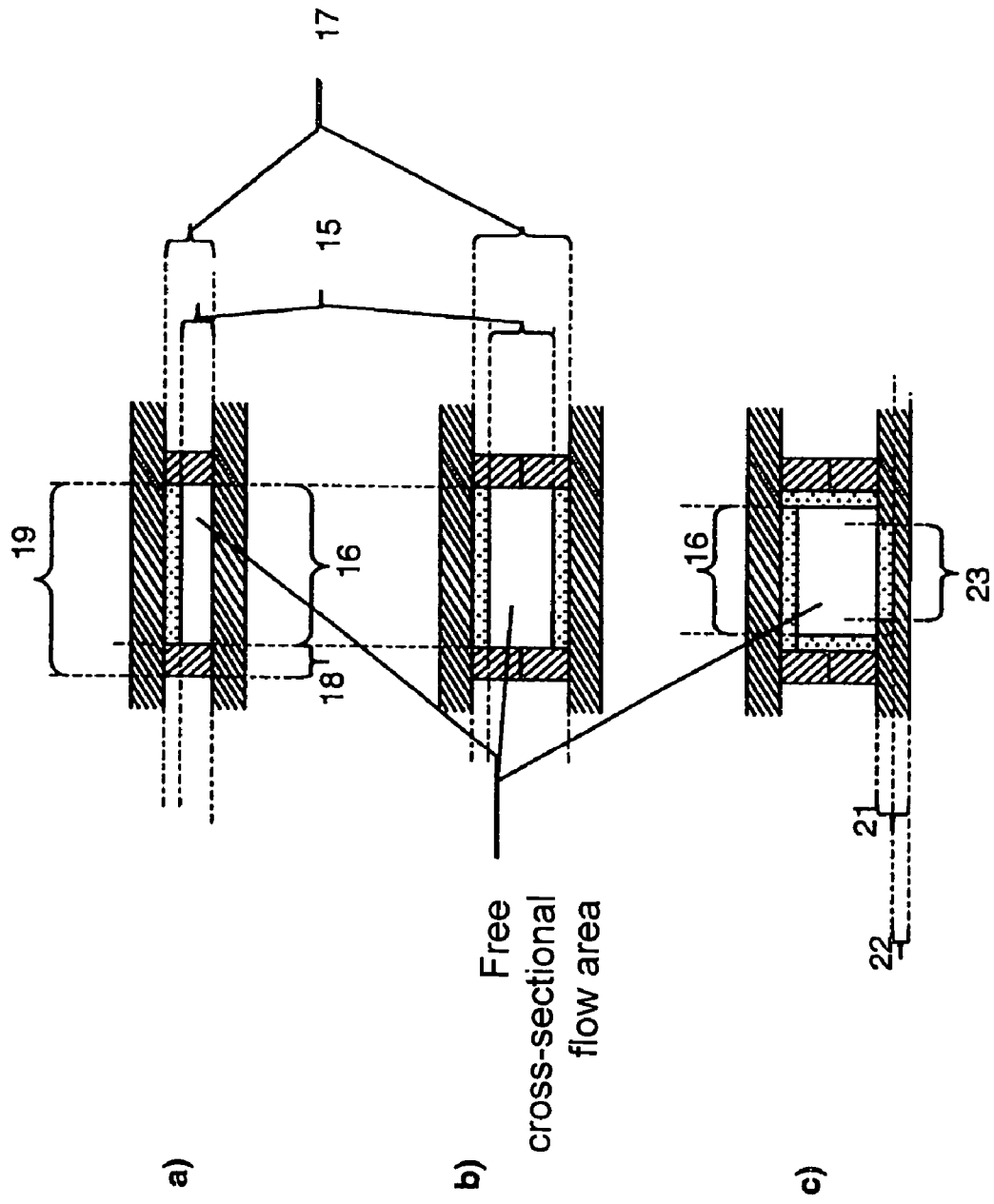
FIG. 6 shows the position of the dimensions used.

FIG. 6 shows the position of the dimensions used and the length data applied in this publication. It is clear that a slot's cross section of free flow is derived from the gap width 16 times the web height 17 minus the cross sectional area of the applied catalyst material 12, whereby the cross sectional area of the catalyst is normally the product of the layer thickness and the gap width 16. Exceptions are, for example, the variants shown in FIG. 6c), in which the web flanks are also coated with catalyst material or the catalyst material is inserted in a recess or groove (refer to FIG. 6c)). The decisive variable for strength considerations is the actual plate thickness 22 which exists in the area of the smallest plate thickness and in example c) lies in the area of the recess. In examples a) and b) of FIG. 6 it is the plate thickness 21.

FIG. 7 is a detail view of the outlet section of the reaction slots in three variants as well as embodiments of the spacers. Visible in embodiment a) in FIG. 7 are enlargements of the web widths 18 representing inversion sections 32. In embodiment b) of this figure, the slots are formed by a type of colonnade, in which rotationally symmetric spacers are arranged in lanes and catalyst material, represented by dotted areas, is applied in the lanes. In this variant the inversion effect is achieved by means of oval spacers or baffles 29 which are arranged in the main stream of the slots. As can be seen in the partial view c), the spacers are distributed in random positions in the chamber, the inversion section 32 being formed by a closer standing arrangement of spacers. In this example the catalyst material is applied to the complete plate surface and also extends to the area behind the inversion stage.

Two embodiments of the web arrangement inside a reaction chamber are shown in FIG. 8. In both examples the webs of the plates face each other, whereby in a) the webs are arranged at right angles to each other. In embodiment b) there is a random angle α between the webs. In both cases, high lateral mixing is achieved in the section between the manifold 6 and the header 7.

KEY TO REFERENCE NUMBERS

1 Plate, base plate
2 Feed line fluid 1
3 Feed side, heat carrier fluid
4 Product stream discharge
5 Heat carrier fluid discharge
6 Manifold
7 Header
8 Reaction chamber
9 Guide webs
10 Heat carrier chamber/heat carrier fluid
11 Spacer
12 Catalyst material
13 Cross section of free flow
14 Direction of main stream
15 Slot height
16 Slot width
17 Web height
18 Web width
19 Web spacing
20 Height of catalyst
21 Plate thickness
22 Actual plate thickness
23 Groove/recess width
24 Feed side fluid 2/fluid 3
25 Bores
26 Gasket
27 Spacer of cylinder
28 Guide webs
29 Internals
30 Mixing section
31 Homogenization section
32 Inversion section

The invention claimed is:

1. A microreactor for performing heterogeneous catalytic reactions, having a multiplicity of chambers in vertical or horizontal and essentially parallel arrangement, each being equipped with at least one feed line and one discharge line, the feed lines being connected to at least one manifold and the discharges to at least one header, the chambers being formed by stacked plates or layers, and one part of the chambers representing reaction chambers and the other part of the chambers representing heat carrier chambers, the heat transport between reaction and heat carrier chambers taking place through at least one common chamber wall formed by a common plate, with spacers being arranged in all chambers, wherein catalyst material is applied at least in part to the internal walls of the reactor chambers, the hydraulic diameter, defined as the quotient of the four-fold area to the circumferential length of the cross section of free flow, in the reaction chambers is smaller than 4000 µm, and the ratio between the smallest perpendicular distance between two neighboring spacers to the slot height of the reaction chamber after coating with catalyst is smaller than 800, and greater than or equal to 10.

2. The microreactor in accordance with claim 1, wherein the share of the standing or base area of the spacers in relation to the area of the plate lying within a circumferential gasket and welded or soldered sealing seams terminating the reaction chamber or heat carrier chamber equals at least 2.5%, and does not exceed 30%.

3. The microreactor in accordance with claim 1, wherein spacers constructed as webs or continuous webs have a web width greater than or equal to 1000 µm and are not wider than 6000 µm.

4. The microreactor in accordance with claim 1, wherein the catalytic material is applied in a slot essentially on the plate.

5. The microreactor in accordance with claim 1, wherein at least partial areas of the manifold and/or header are coated with catalytic material or are made of material with a catalytic effect.

6. The microreactor in accordance with claim 1, wherein the material of at least a partial area of the chamber wall or the spacers has a catalytic effect.

7. The microreactor in accordance with claim 1, wherein the feed lines and discharges of the reaction and heat carrier chambers are arranged to result in a co-directional, counter-directional or meandering throughflow in relation to the next chamber.

8. The microreactor in accordance with claim 1, wherein the plates have recesses in the reaction chambers, in which at least part of the catalyst material is inserted, the recesses being able to assume any shape and being designed in groove form and extending exactly in one gap.

9. The microreactor in accordance with claim 1, wherein the webs of two plates are arranged facing each other so that the webs form an angle of 0° to 90° with each other.

10. The microreactor in accordance with claim 1, wherein provision is made for at least one device at the entrance to and inside the reaction chambers in direction of the main stream, which reduces the free cross sectional area perpendicular to the direction of the main stream, the device having a random shape.

11. The microreactor in accordance with claim 1, wherein provision is made for at least one area at the entrance to and inside the reaction chambers in which at least two fluids are mixed, whereby at least one fluid is injected essentially perpendicular to the direction of the main stream and a homogenization section is arranged downstream of the injection unit.

12. The microreactor in accordance with claim 11, wherein a fluid is injected through bores in the chamber wall, which are inclined at an angle of −60° to +60° in relation to the perpendicular to the direction of the main stream and are connected by means of at least one fluid channel extending essentially transverse to the direction of the main stream.

13. The microreactor in accordance with claim 1, wherein provision is made for at least one device at the end of the reaction chambers in flow direction, which reduces the free cross sectional area perpendicular to the direction of the main stream, the device having a random shape and being constructed advantageously of a multiplicity of spacers, as extensions of the web widths or as baffles and ideally as a reduction of the gap height.

14. The microreactor in accordance with claim 13, wherein the pressure loss due to the cross section reduction at the outlet of the plates has to be greater than the fluctuation of the pressure difference resulting from the production tolerances of the catalyst layer and/or the gap by at least the factor 5.

15. The microreactor according to claim 1, wherein the hydraulic diameter in the reaction chambers is smaller than 1500 µm.

16. The microreactor according to claim 1, wherein the hydraulic diameter in the reaction chamber is smaller than 500 µm.

17. A process for the use of the microreactor in accordance with claim 1, wherein liquid or gaseous media are passed through in the heat carrier chambers.

18. The process in accordance with claim 17, wherein the media in the heat carrier chambers change their aggregate condition completely or partly while passing through.

19. The process in accordance with claim 17, wherein the process lies at differential pressures between the reaction and heat carrier chambers in the range of 0 bar to 15 bar.

20. The process in accordance with claim 17, wherein the process is used at temperatures below 500° C.

21. The process in accordance with claim 17, wherein the process is used in a synthesis process selected from the group consisting of:
  a) the synthesis of hydrocarbon compounds or the oxygenates thereof;
  b) the synthesis of propylene oxide from essentially hydrogen peroxide and propene;
  c) the synthesis of phenol; and
  d) the synthesis of hydrogen peroxide from essentially hydrogen and oxygen.

* * * * *